(12) United States Patent
Kuo

(10) Patent No.: US 11,084,938 B2
(45) Date of Patent: Aug. 10, 2021

(54) COMPOSITE COATING ON A CONTACT FACE OF A TOOL

(71) Applicant: Sing Ray Corporation, Taichung (TW)

(72) Inventor: Chin-Chih Kuo, Taichung (TW)

(73) Assignee: SING RAY CORPORATION, Taichung (TW)

( * ) Notice: Subject to any disclaimer, the term of this patent is extended or adjusted under 35 U.S.C. 154(b) by 161 days.

(21) Appl. No.: 16/131,835

(22) Filed: Sep. 14, 2018

(65) Prior Publication Data

US 2020/0087518 A1    Mar. 19, 2020

(51) Int. Cl.
| | |
|---|---|
| *C09D 1/00* | (2006.01) |
| *B26B 13/06* | (2006.01) |
| *B25B 15/02* | (2006.01) |
| *B24D 3/34* | (2006.01) |
| *C01B 32/25* | (2017.01) |
| *B26B 13/28* | (2006.01) |
| *B25B 15/00* | (2006.01) |
| *B25B 23/00* | (2006.01) |

(52) U.S. Cl.
CPC ............... *C09D 1/00* (2013.01); *B24D 3/346* (2013.01); *B25B 15/02* (2013.01); *B26B 13/06* (2013.01); *C01B 32/25* (2017.08); *B25B 15/005* (2013.01); *B25B 15/007* (2013.01); *B25B 23/0035* (2013.01); *B26B 13/28* (2013.01); *C01P 2004/61* (2013.01)

(58) Field of Classification Search
None
See application file for complete search history.

(56) References Cited

U.S. PATENT DOCUMENTS

2007/0134488 A1* 6/2007 Hayakawa ............... A47J 36/02
428/323

OTHER PUBLICATIONS

Mohs Rosiwal and Knoop scale, accessed on Nov. 25, 2020 from themeter.net/durezza_e.htm, note that the year 2010 has been derived from the copyright indicated on the document (Year: 2010).*

* cited by examiner

*Primary Examiner* — Colin W. Slifka
(74) *Attorney, Agent, or Firm* — Muncy, Geissler, Olds & Lowe, P.C.

(57) ABSTRACT

A composite coating is provided for a tool. The tool can be a pair of scissors or a screwdriver for example. The tool is made with at least one contact face. The composite coating includes diamond grains and layer of metal oxide. The metal oxide is used as an adhesive to secure the diamond grains to the contact face.

5 Claims, 14 Drawing Sheets

COMPOSITE COATING ON A CONTACT FACE OF A TOOL

BACKGROUND OF INVENTION

1. Field of Invention

The present invention relates to a tool and, more particularly, to a composite coating on a contact face of a tool.

2. Related Prior Art

There are various tools such as knives, pairs of scissors and screwdrivers. A pair of scissors includes two blades and two handles. Each of the blades is made with a cutting edge. In use, the handles are pivoted from each other to pivot the blades from each other. Thus, an object to be cut can be located between the blades. Then, the handles are pivoted toward each other to pivot the blades toward each other, thereby shearing the object. However, after some time of use, the cutting edges of the blades inevitably become obtuse, thereby rendering it difficult to shear with the pair of scissors.

A screwdriver includes a flat, cruciform or star-shaped tip for example. In use, the tip of the screwdriver is engaged with a compliant recess made in a screw for example so that the screwdriver can be operated to drive the screw. The tip is made with at least two faces for contact with faces of the screw. However, the tip of the screwdriver could easily be disengaged from the screw. That is, the faces of the tip of the screwdriver could easily be moved relative to and worn against the faces of the screw.

Miniature ribs can be made on the faces of the tip of the screwdriver to prevent such disengagement. However, such miniature ribs have been proved to be ineffective. Hence, the wearing of the faces of the tip of the screwdriver is not considerably reduced.

The present invention is therefore intended to obviate or at least alleviate the problems encountered in prior art.

SUMMARY OF INVENTION

It is the primary objective of the present invention to provide a composite coating for a tool made with a contact face.

To achieve the foregoing objective, the composite coating includes diamond grains and a layer of metal oxide. The metal oxide is used as an adhesive to secure the diamond grains to the contact face.

Other objectives, advantages and features of the present invention will be apparent from the following description referring to the attached drawings.

BRIEF DESCRIPTION OF DRAWINGS

The present invention will be described via detailed illustration of embodiments referring to the drawings wherein.

DETAILED DESCRIPTION OF EMBODIMENTS

Figure 1:
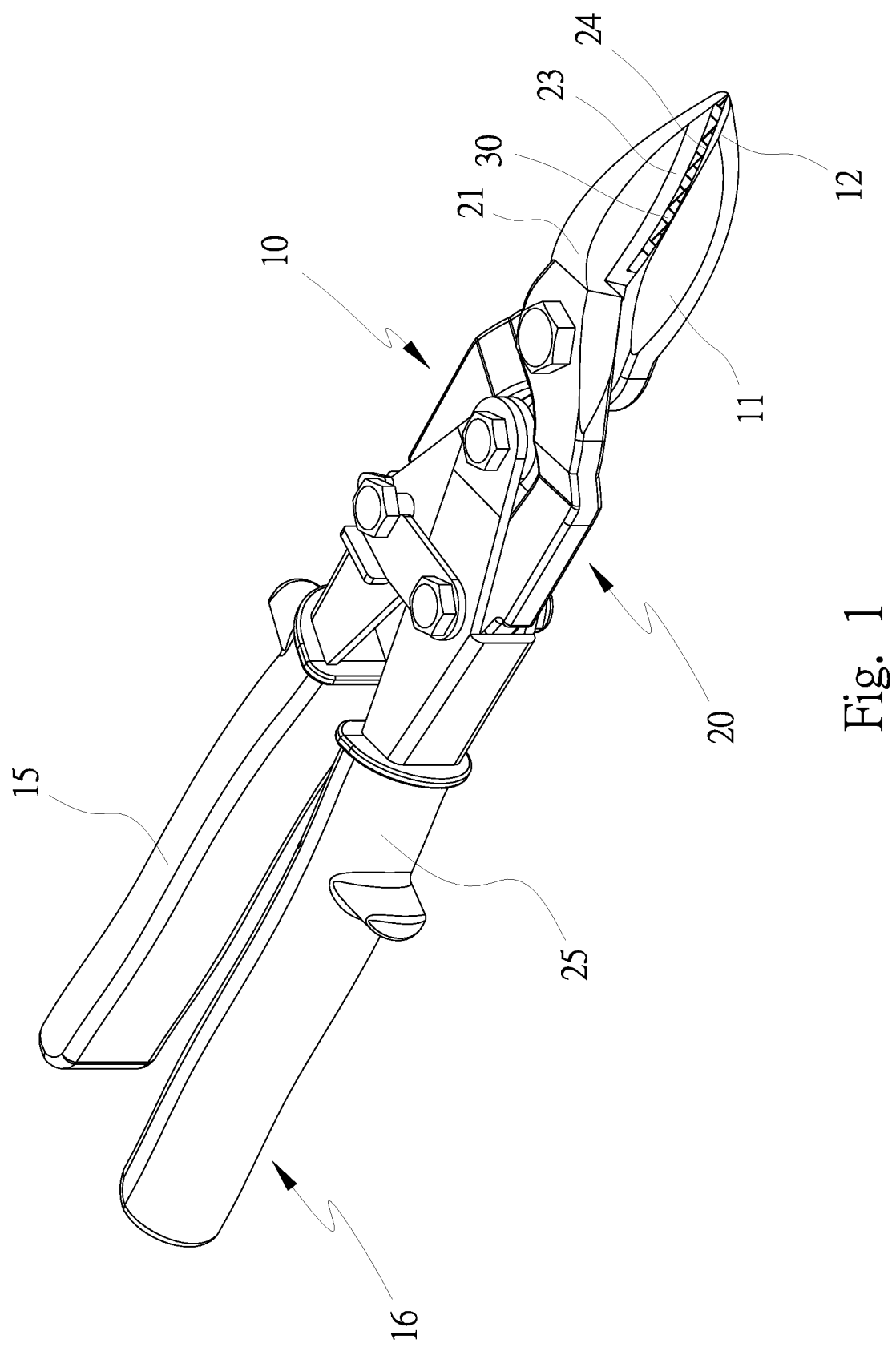
FIG. 1 is a perspective view of a pair of scissors provided with a composite coating according to a first embodiment of the present invention.
Figure 2:
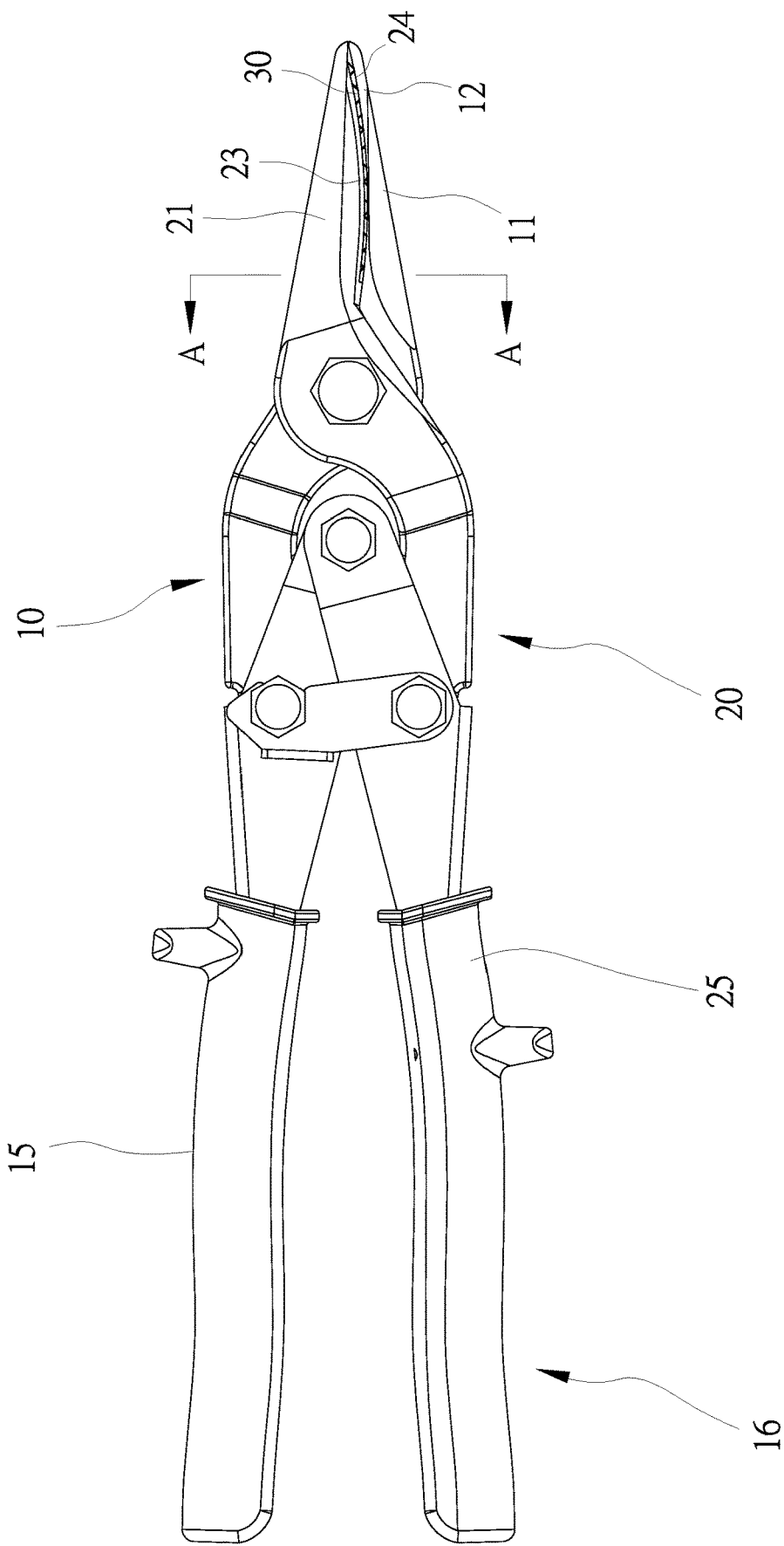
FIG. 2 is a top view of the pair of scissors shown in FIG. 1.
Figure 3:
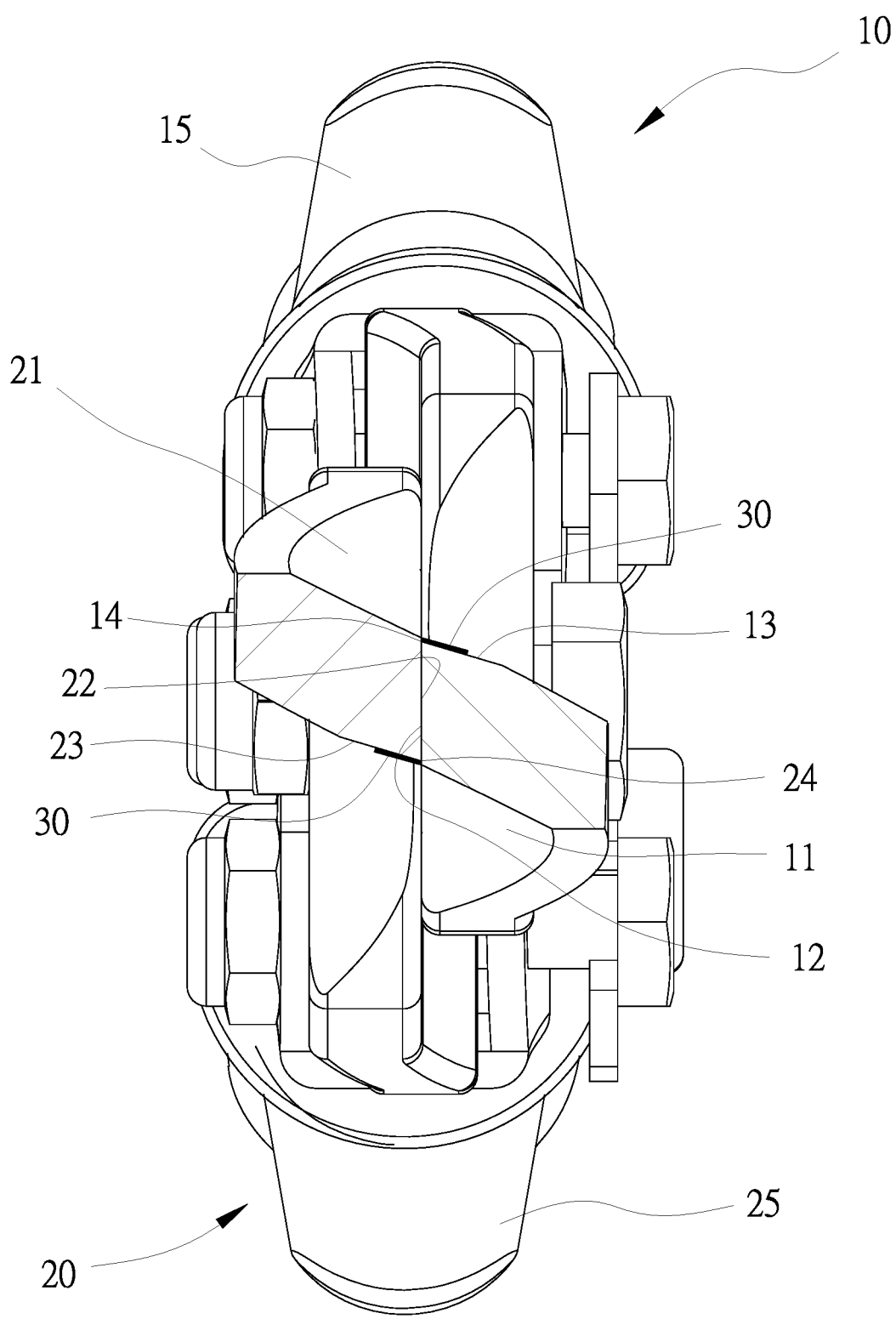
FIG. 3 is a cross-sectional view of the pair of scissors taken along a line A-A shown in FIG. 2.
Figure 4:
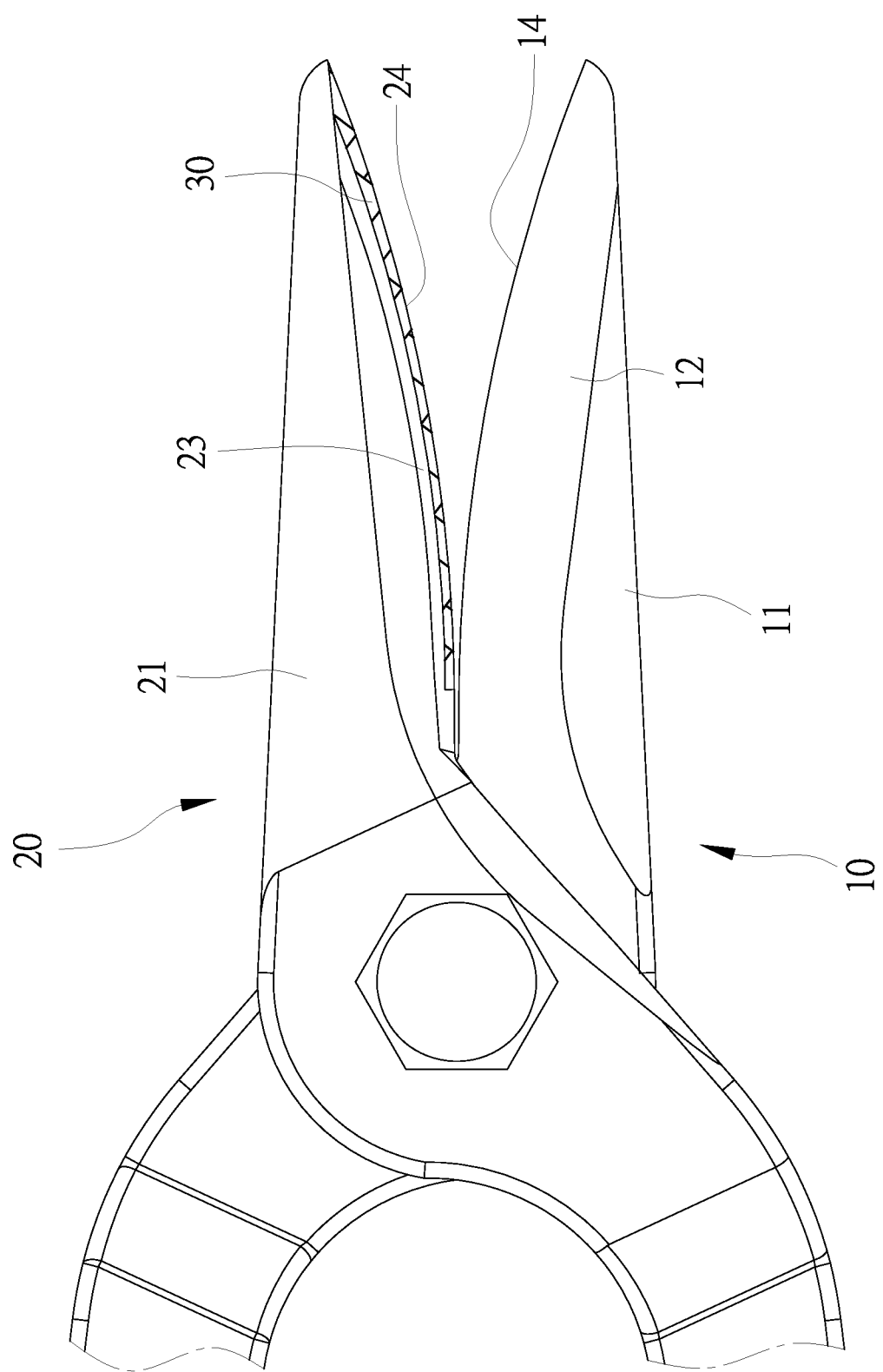
FIG. 4 is an enlarged partial view of the pair of scissors shown in FIG. 2.
Figure 5:
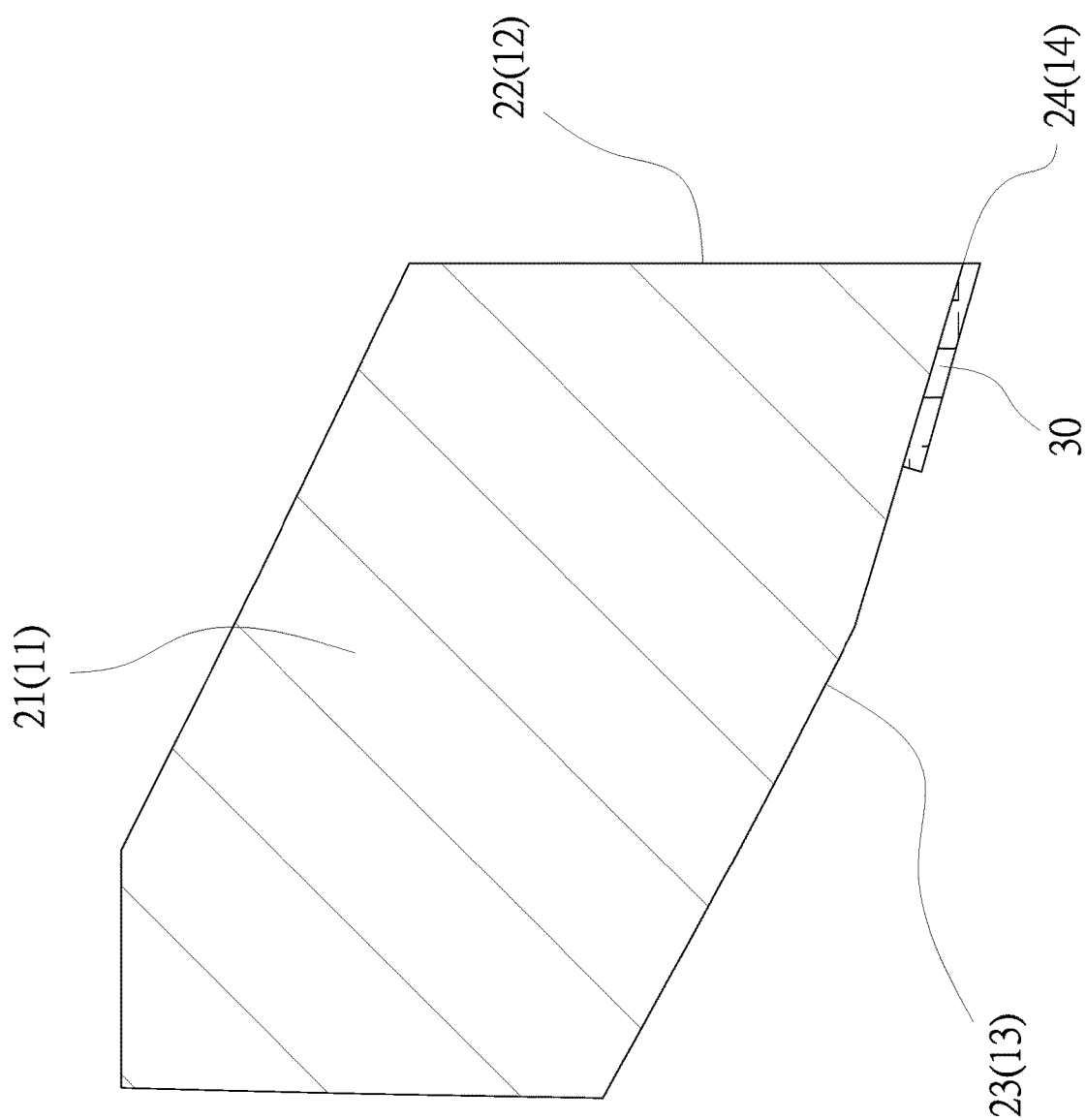
FIG. 5 is an enlarged partial view of a blade of the pair of scissors shown in FIG. 3.

Referring to FIGS. 1 through 5, a pair of scissors 16 includes two knives 10 and 20. The knife 10 includes a blade 11 and a handle 15. The knife 20 includes a blade 21 and a handle 25. The blade 11 includes a cutting edge 14 formed between a primary face 13 and a secondary face 12. The blade 21 includes a cutting edge 24 formed between a primary face 23 and a secondary face 22.

Figure 8:
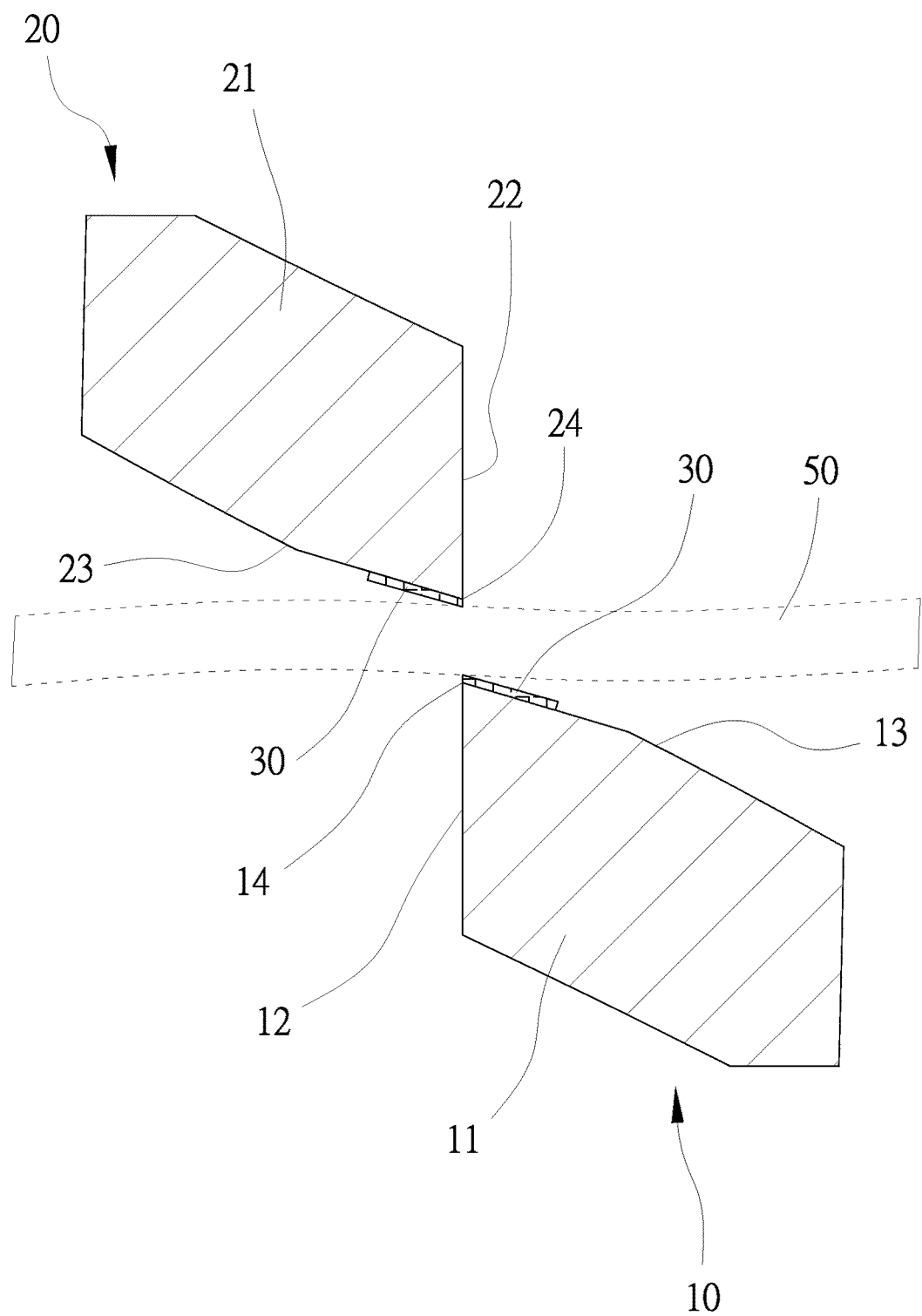
FIG. 8 is an enlarged partial view of the pair of scissors shown in FIG. 3.

In a shearing operation, the handles 15 and 25 are pivoted from each other so that the blades 11 and 21 are pivoted from each other. Then, an object 50 (FIG. 8) such as an iron sheet, a stainless steel sheet, a cardboard, a plastic sheet, a plastic string and a twig is located between the blades 11 and 21. Finally, the handles 15 and 25 are pivoted toward each other so that the blades 11 and 21 are pivoted toward each other, thereby shearing the object 50 into two pieces. In the closing of the blades 11 and 21, the primary faces 13 and 23 are brought into contact with two opposite faces of the object 50. More details of the shearing operation will not be given for being conventional.

Each of the primary faces 13 and 23 is provided with a composite coating according to a first embodiment of the present invention. Each of the composite coatings 30 includes diamond grains 35 and a layer of metal oxide. The diamond grains 35 can be synthetic or natural diamond grains or aggregated diamond microrods of 10.0 in Mohs Scale of Mineral Hardness. Thus, the composite coating 30 is made with hardness of at least 9 in Mohs Scale of Mineral Hardness.

When the pair of scissors 16 is used to shear the object 50, the primary faces 13 and 23 of the blades 11 and 21 are in contact with the opposite faces of the object 50. Hence, the primary faces 13 and 23 of the blades 11 and 21 of the pair of scissors 16 can be referred to as the "contact faces."

As mentioned above, each of the composite coatings 30 includes diamond grains 35 and a layer of metal oxide. The metal oxide is used as an adhesive to secure the diamond grains 35 to the primary faces 13 and 23. The composite coatings 30 are slender. Longitudinally, each composite coating 30 extends for about the length of the corresponding one of the blades 11 and 21. Transversely, each of the composite coatings 30 extends for about ⅓ of the width of the corresponding one of the primary faces 13 and 23.

Figure 6:
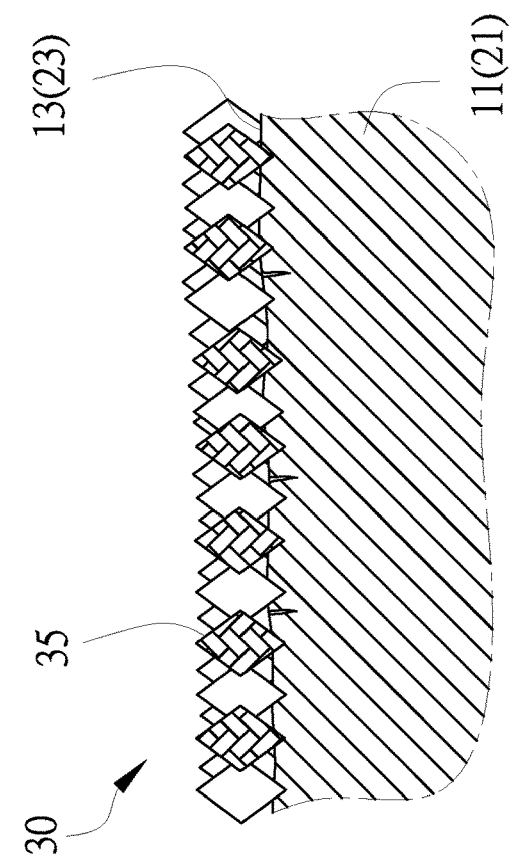
FIG. 6 is an enlarged partial of the blade of the pair of scissors shown in FIG. 5, without a layer of metal oxide.

Referring to FIG. 6, the diamond grains 35 pierce into the blades 11 and 21 through the primary faces 13 and 23. This is possible because the hardness of the diamond grains 35 is higher than that of the blades 11 and 21. For example, the hardness of stainless steel is about 35 to 38 by Rockwell Hardness Test, equivalent to about 5.0 in Mohs Scale of Mineral Hardness. There are cracks (not numbered) in the primary faces 13 and 23. The cracks are produced during heat treatment of the blades 11 and 21.

Figure 7:
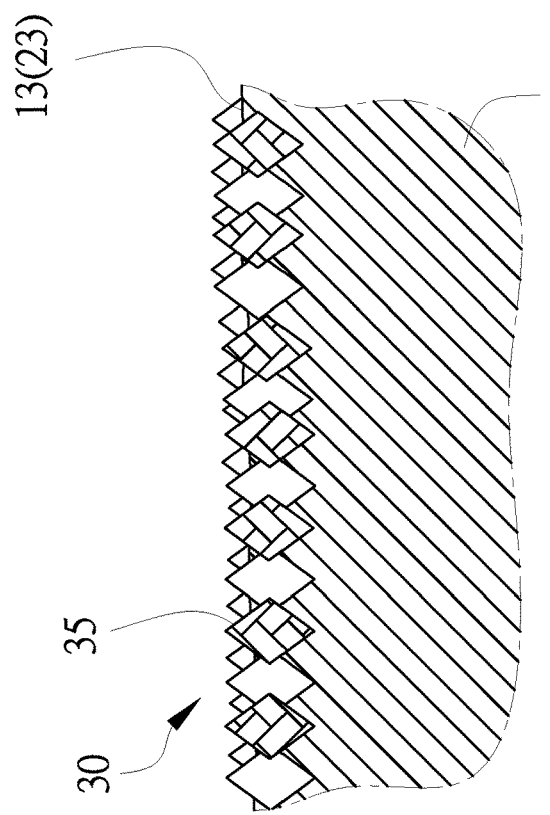
FIG. 7 is an enlarged partial of the blade of the pair of scissors shown in FIG. 5.

Referring to FIG. 7, the metal oxide is filled in the cracks in the primary faces 13 and 23. Thus, the diamond grains 35 are secured to the blades 11 and 21, rendering it difficult to detach any of the diamond grains 35 from the blades 11 and 21. The primary faces 13 and 23 of the blades 11 and 21 are protected by the composite coatings 30, which are made with excellent hardness.

The metal oxide includes but not limited to aluminum oxide, boron trioxide, silicon oxide, chromium trioxide, manganese dioxide, ferric oxide, ferrous ferric oxide, copper oxide and lead tetroxide.

Referring to FIGS. 1 to 3 and 8, the composite coatings 30, which are provided on the primary faces 13 and 23, are brought into contact with the object 50 before the cutting edges 14 and 24. The diamond grains 35 piece through the opposite faces of the object 50, thereby preventing the object 50 from sliding along the cutting edges 14 and 24. Thus, the composite coatings 30 hold the object 50 in position in addition to protecting the cutting edges 14 and 24 of the blades 11 and 21.

As discussed above, the pair of scissors 16 provided with the composite coatings 30 includes at least two advantageous features. Firstly, the composite coatings 30 protect the cutting edges 14 and 24 from the object 50, thereby keeping the cutting edges 14 and 24 sharp and allowing the blades 11 and 21 of the pair of scissors 16 to be used for a long period of time.

Secondly, the diamond grains 35, which are miniature and hard, pierce into and hold the object 50 in position during the shearing, thereby rendering the shearing clear without leaving zigzag edges or burrs on the object 50. Hence, there is no need to finish the edges of the pieces of the object 50. Time and cost are saved.

Figure 9:
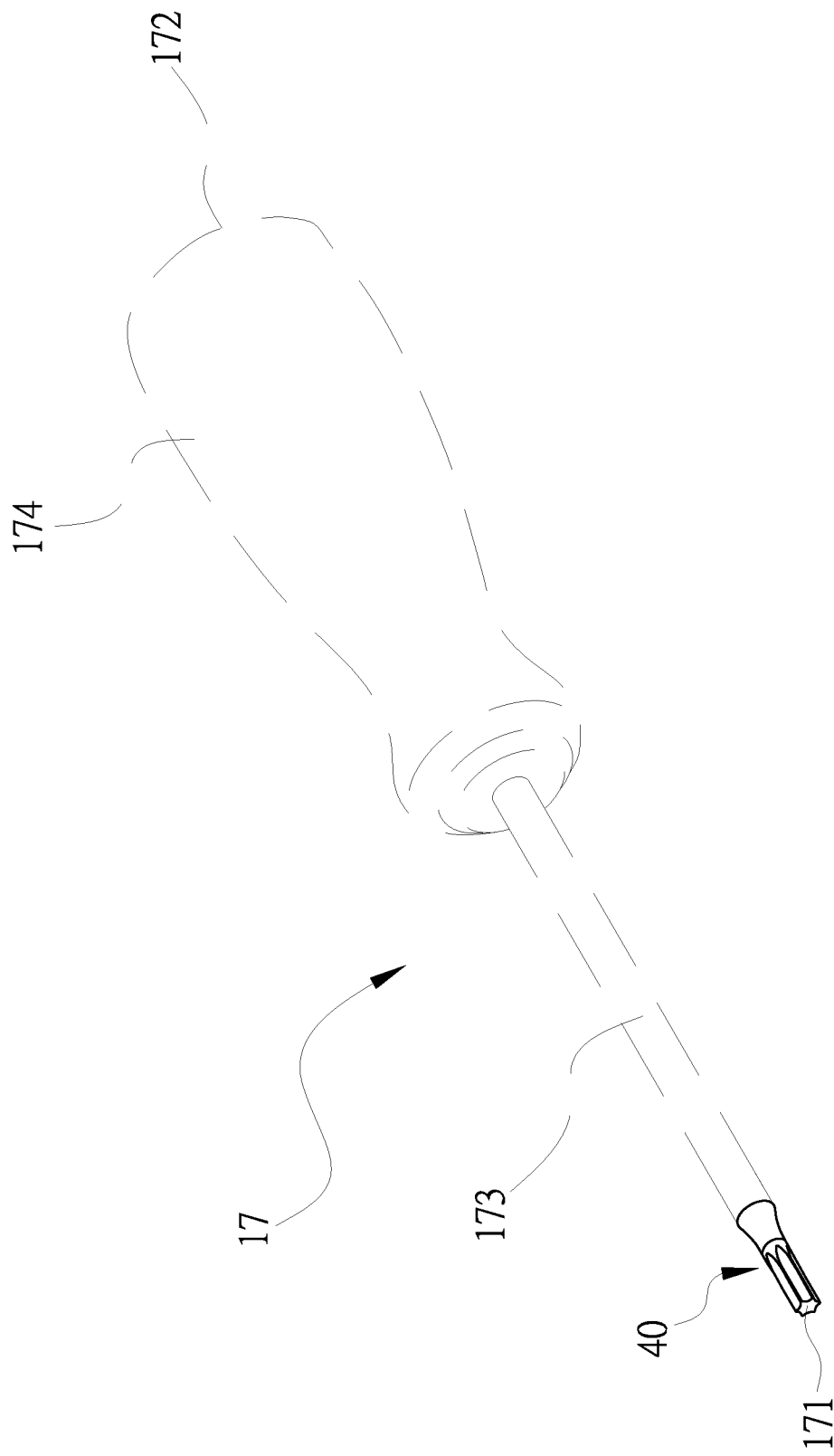
FIG. 9 is a perspective view of a screwdriver provided with a composite coating according to a second embodiment of the present invention.
Figure 10:
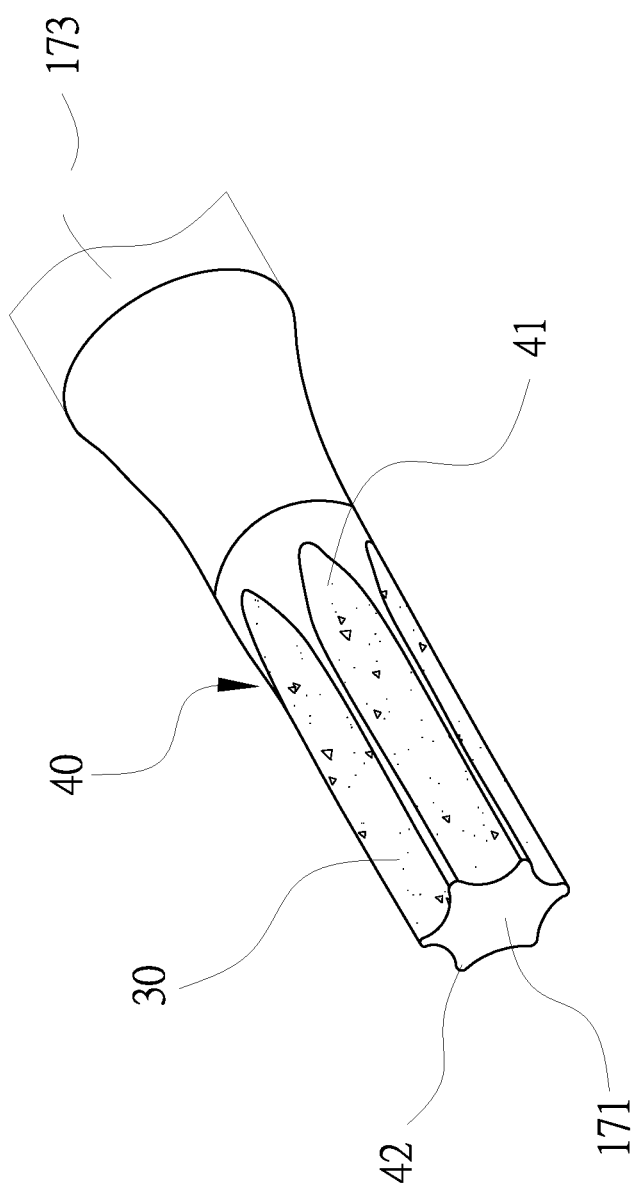
FIG. 10 is an enlarged partial view of the screwdriver shown in FIG. 9.

Referring to FIGS. 9 and 10, several composite coatings 30 are provided on a screwdriver 17 according to a second embodiment of the present invention. The screwdriver 17 includes a shank 173 and a handle 174. The shank 173 includes an end inserted in the handle 174 and a free end 171 located out of the handle 174. The free end 171 of the shank 173 is referred to as the first end 171 of the screwdriver 17. The handle 174 includes a free end 172 extending opposite to the first end 171 of the screwdriver 17. The free end 172 of the handle 174 is referred to as a second end 172 of the screwdriver 17.

In use, the first end 171 of the screwdriver 17 is inserted in a compliant recess made in a screw for example. Then, the handle 174 is rotated to rotate the shank 173, and the shank 173 rotates the screw.

An engaging portion 40 is provided at the second end 172 of the screwdriver 17. The engaging portion 40 includes six or any other proper number of contact faces 41 and angles 42. The engaging portion 40 can include any other proper number of contact faces 41 and angles 42. The contact faces 41 are concave faces. Longitudinally, each of the contact faces 41 extends toward the handle 174 from the first end 171 of the screwdriver 17. Transversely, each of the contact faces 41 extends between two adjacent ones of the angles 42. Thus, the first end 171 of the screwdriver 17 is star-shaped in an end view. Each composite coating 30 is provided all over the corresponding contact face 41.

Figure 11:
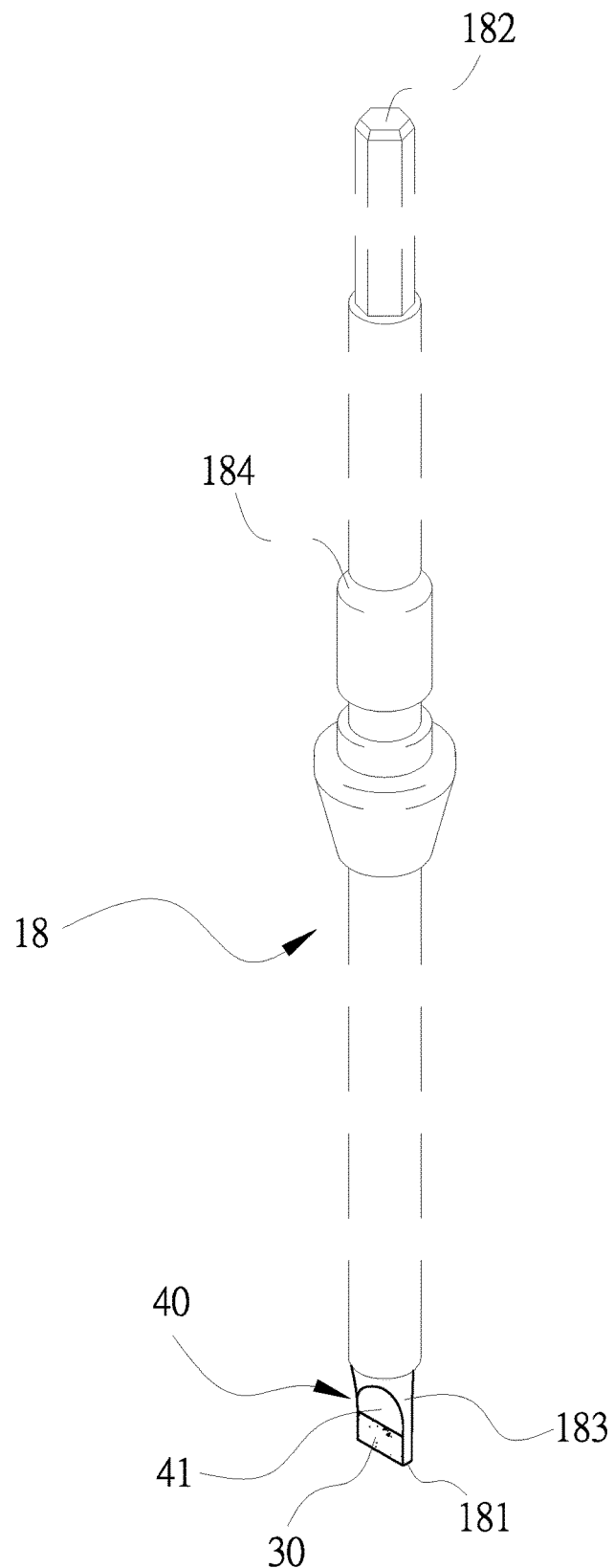
FIG. 11 is a perspective view of a screwdriver provided with a composite coating according to a third embodiment of the present invention.
Figure 12:
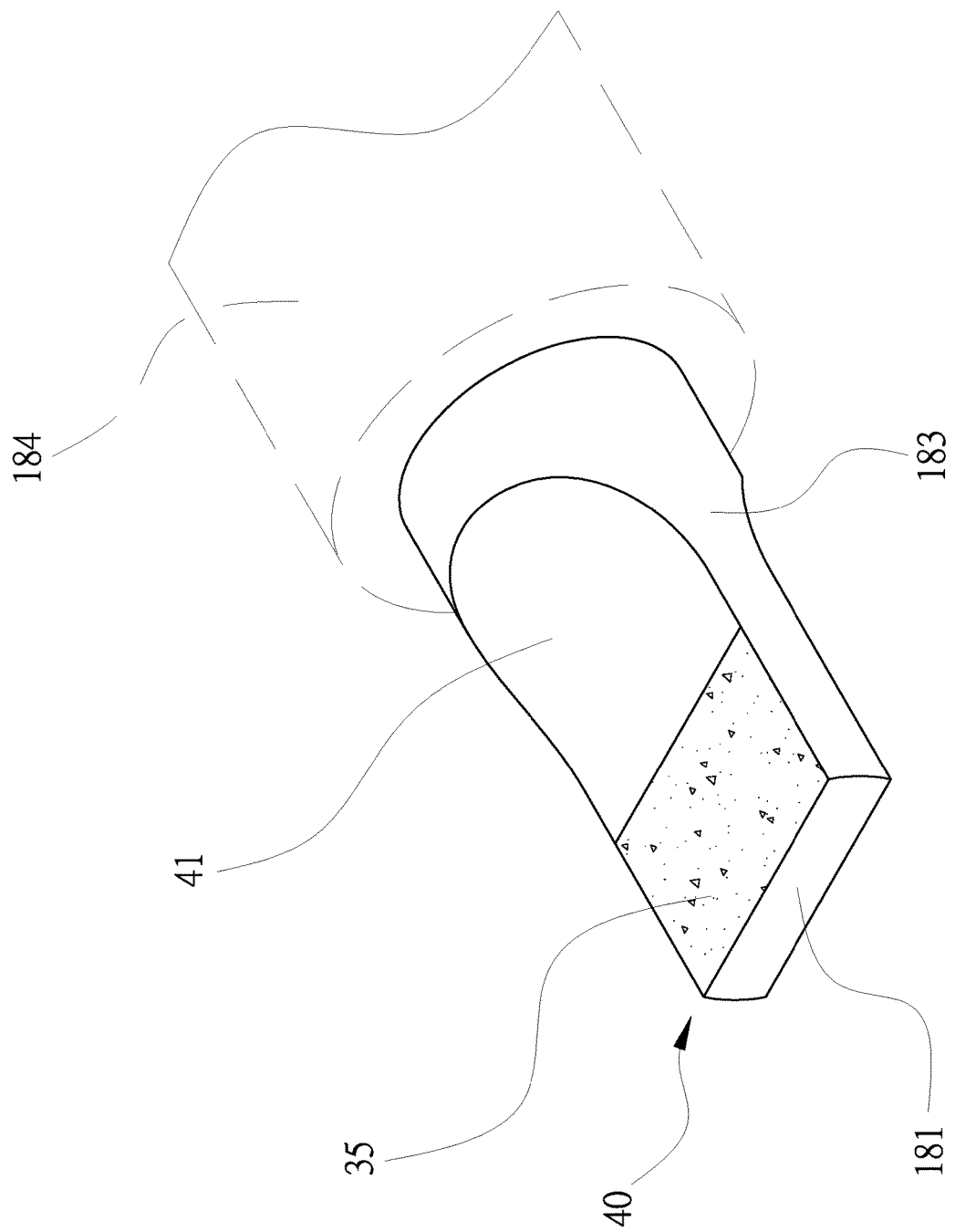
FIG. 12 is an enlarged partial view of the screwdriver shown in FIG. 11.

Referring to FIGS. 11 and 12, several composite coatings 30 are provided on a bit 18 of a screwdriver according to a third embodiment of the present invention. The bit 18 includes a shank 183 and a shell 184. The bit 18 is made of metal. The shell 184 is made of an electrically isolative material such as plastics. The shank 183 is formed with a first end 181 and a second end 182. The second end 182 of the shank 183 is polygonal in an end view. In use, the second end 182 of the shank 183 is inserted in a compliant recess made in a handle or a pneumatic or electric tool. A middle section of the shank 183 is inserted in the shell 184. Preferably, the shank 183 is not rotatable relative to the shell 184.

An engaging portion 40 is formed at the first end 181 of the shank 183. The engaging portion 40 includes two contact faces 41 opposite to each other. Each of the composite coatings 30 is provided on a corresponding one of the contact faces 41. Each composite coating 30 extends from the first end 181 of the shank 183 and covers about ½ of the area of the corresponding contact face 41.

Figure 13:
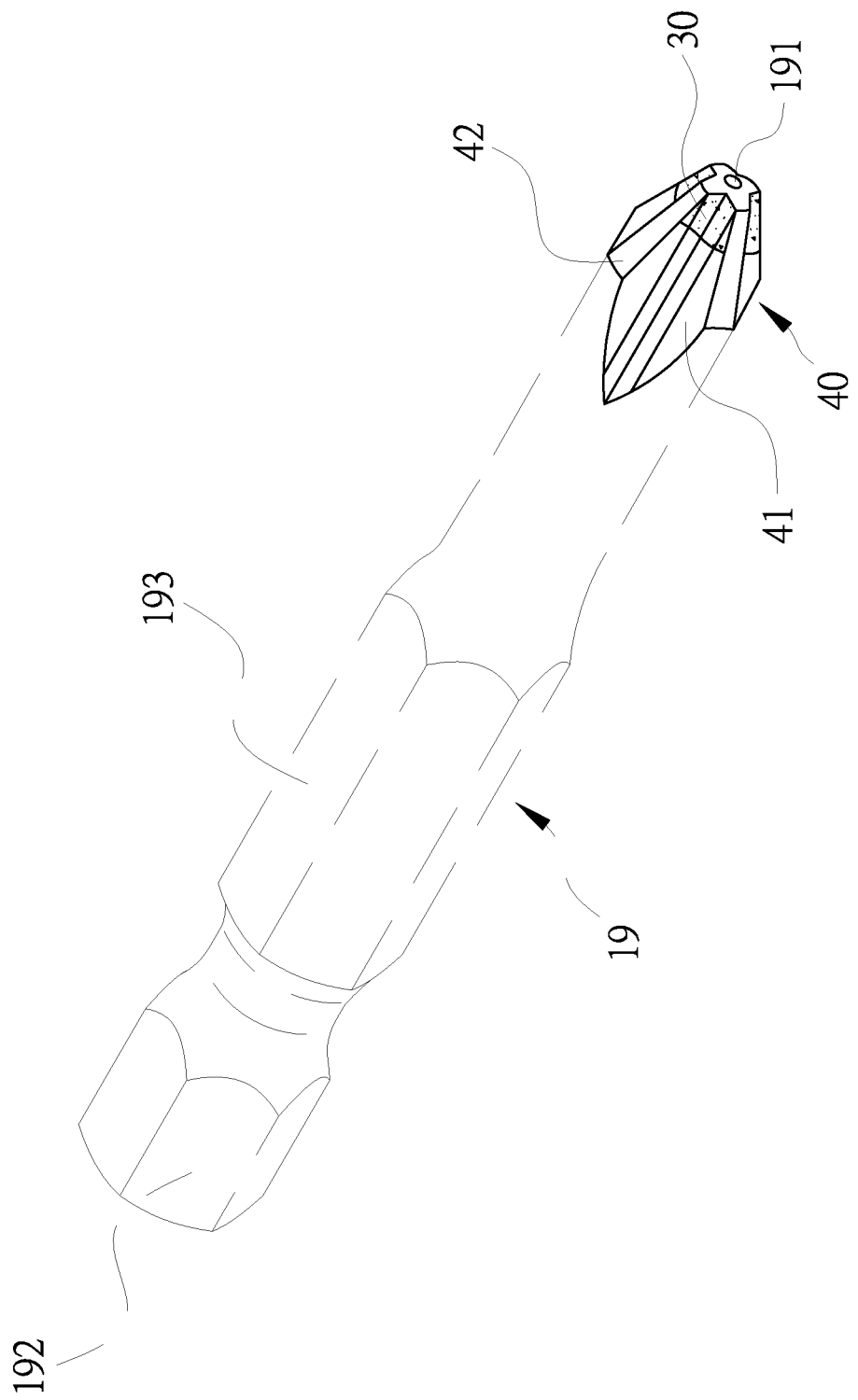
FIG. 13 is a perspective view of a screwdriver provided with a composite coating according to a fourth embodiment of the present invention.
Figure 14:
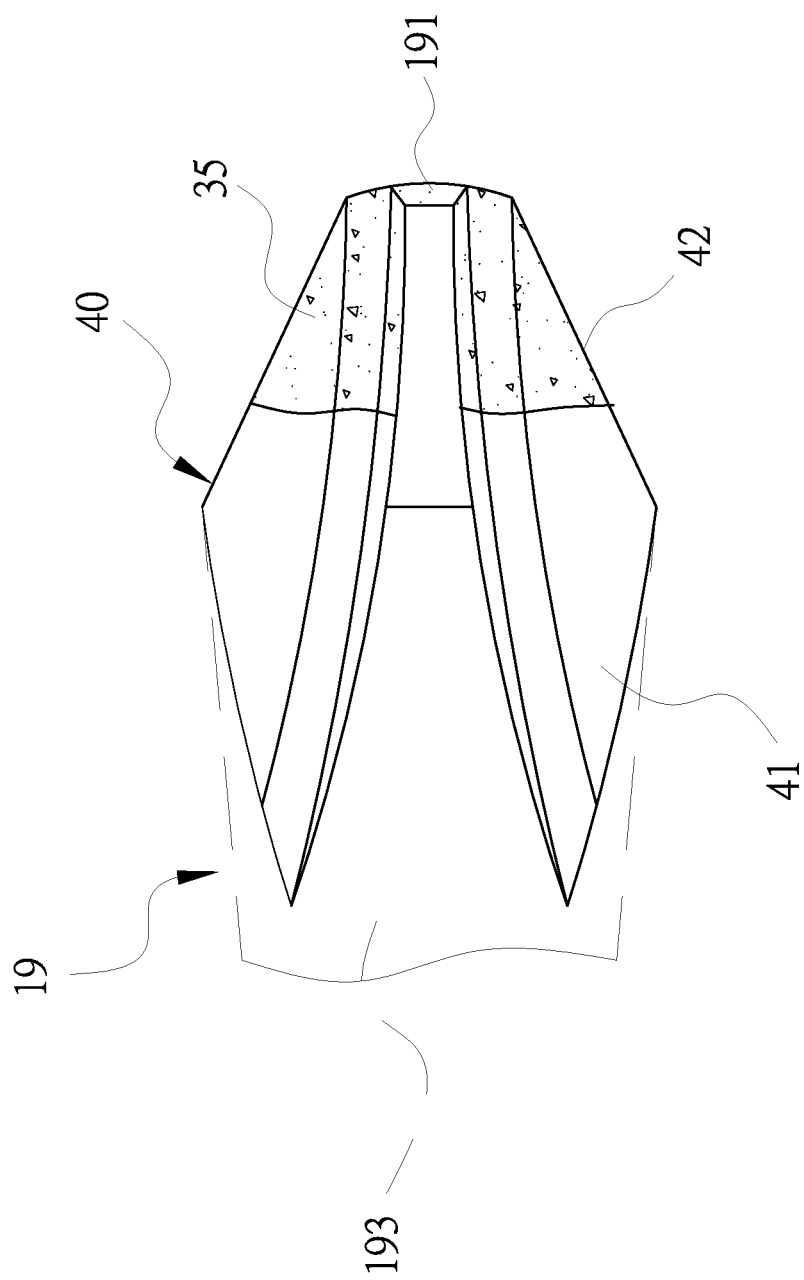
FIG. 14 is an enlarged partial view of the screwdriver shown in FIG. 13.

Referring to FIGS. 13 and 14, several composite coatings 30 are provided on another bit 19 of a screwdriver according to a fourth embodiment of the present invention. The bit 19 includes a first end 191, a second end 192 and a middle section 193.

An engaging portion 40 is formed at the first end 191 of the bit 19. The engaging portion 40 includes four contact faces 41. Each of the composite coatings 30 is provided on a corresponding one of the contact faces 41. Each composite coating 30 extends from the first end 191 of the bit 19 and covers about ⅓ of the corresponding contact face 41.

Advantageously, each of the composite coatings 30 provides a rough face for contact with a contact face of an object such as a sheet and a screw. There is adequate friction between the rough face of each of the composite coatings 30 and the corresponding contact face of the object, thereby ensuring firm engagement of the tool with the object.

Figure 15:
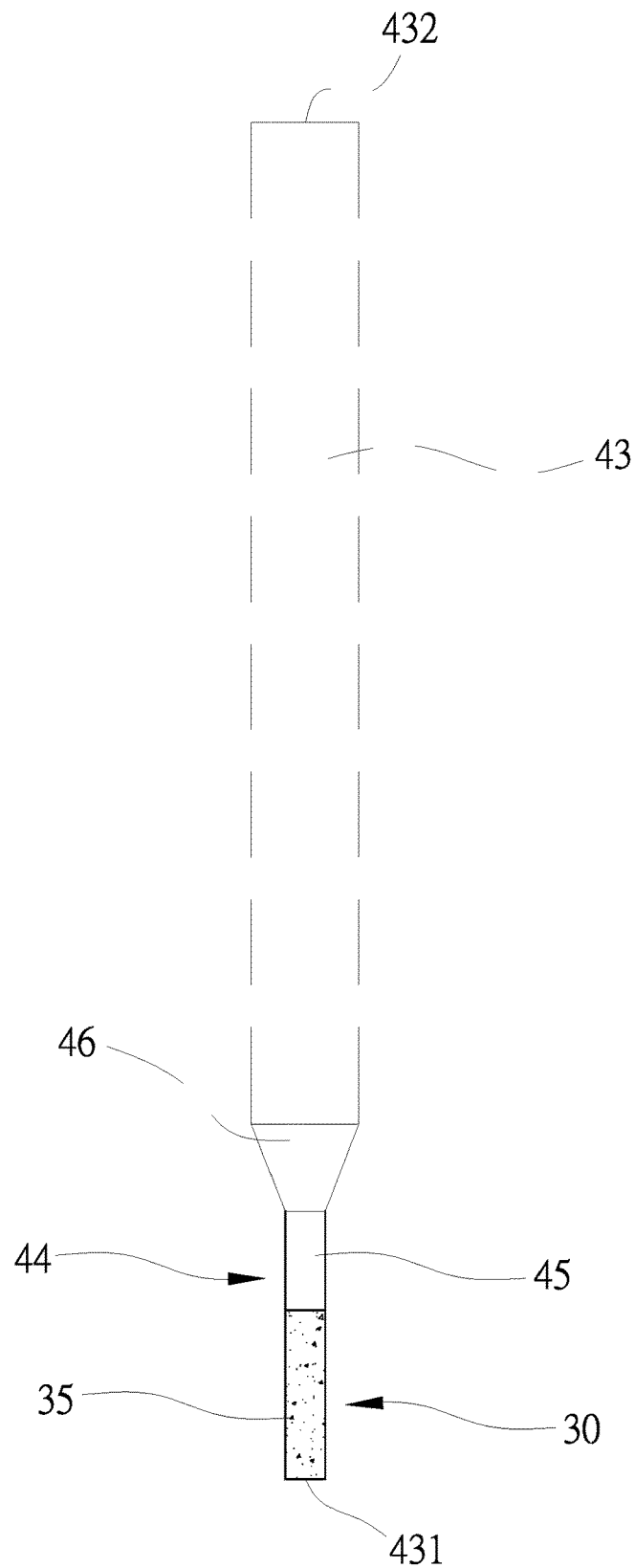
FIG. 15 is a side view of a grinding rod provided with a composite coating according to a fifth embodiment of the present invention.

Referring to FIG. 15, a composite coating 30 is provided on a grinding rod 43 according to a fifth embodiment of the present invention. The grinding rod 43 includes two ends 431 and 432, a main section (not numbered) near the end 432, a reduced section 44 near the end 431, and a conical section 46 extending to the reduced section 44 from the main section. The reduced section 44 is made with a reduced diameter in comparison with that of the main section.

The reduced section 44 is made with a periphery 45 that is the contact face of the grinding rod 43. The composite coating 30, which includes the diamond grains 35, covers about ½ of the periphery 45.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A tool comprising a contact face and a composite coating formed on at least ⅓ of the contact face, the composite coating comprising diamond grains and a layer of metal oxide used as an adhesive for securing the diamond grains to the contact face, wherein the composite coating is made with hardness of at least 9.0 in Mohs Scale of Mineral Hardness.

2. The tool according to claim 1, wherein the tool is a pair of scissors that includes two blades pivotally connected to each other, wherein each of the blades comprises a primary face, a secondary face and a cutting edge formed between the primary and secondary faces, wherein the primary face is the contact face.

3. The tool according to claim 2, wherein the composite coating longitudinally extends from a free end of the corresponding blade.

4. The tool according to claim 2, wherein the composite coating transversely extends for about ⅓ of width of the primary faces of the corresponding blade.

5. The tool according to claim 1, wherein the tool is a grinding rod comprising a main section, a reduced section, and a conical section extending to the reduced section from the main section, wherein the composite coating covers about ½ of a periphery of the reduced section.

* * * * *